United States Patent [19]

Slusarski

[11] 4,094,559
[45] June 13, 1978

[54] FLANGED BEARING CARTRIDGE

[75] Inventor: Ronald S. Slusarski, Berlin, Conn.

[73] Assignee: Textron Inc., Providence, R.I.

[21] Appl. No.: 755,655

[22] Filed: Dec. 30, 1976

[51] Int. Cl.² .................... F16C 23/08; F16C 35/06
[52] U.S. Cl. .................... 308/194; 29/149.5 PM; 308/72
[58] Field of Search ............ 308/29, 72, 189 R, 193, 308/194, 245, 140; 29/149.5 PM

[56] References Cited

U.S. PATENT DOCUMENTS

| 2,669,491 | 2/1954 | Haller | 308/72 |
| 2,812,224 | 11/1957 | Richmond | 308/194 |
| 3,339,991 | 9/1967 | Howe | 308/194 |
| 3,365,253 | 1/1968 | Haller | 308/194 |
| 3,782,794 | 1/1974 | Chmura et al. | 308/193 |
| 4,026,657 | 5/1977 | Chmura | 308/72 |

FOREIGN PATENT DOCUMENTS

| 2,033,084 | 1/1971 | Germany | 308/72 |

Primary Examiner—Trygve M. Blix
Assistant Examiner—Charles E. Frankfort
Attorney, Agent, or Firm—Hopgood, Calimafde, Kalil, Blaustein & Lieberman

[57] ABSTRACT

A flanged bearing cartridge is provided comprising a sintered powdered steel flange housing formed of a steel composition consisting essentially by weight of up to about 6% Ni, up to about 3% Cu, up to about 2% Mn and/or Si, about 0.2 to 1.2% C and the balance at least about 90% iron. The sintered flange has a density ranging from about 80 to 92% of actual (theoretical) density of the composition and has a circular bore for receiving a bearing, the bore having a continuous inner wall of predetermined axial thickness located centrally of the housing and passing axially through the plane of the housing, the inner wall being configurated with a spherical groove and having inserted therein an annular antifriction bearing comprising inner and outer rings with a complement of bearing elements held therebetween.

8 Claims, 12 Drawing Figures

FIG.7    (PRIOR ART)

FLANGED BEARING CARTRIDGE

This invention relates to a bearing flange housing produced by powder metallurgy and to a flanged bearing cartridge comprising an annular antifriction bearing mounted in a sintered bearing flange housing.

STATE OF THE ART

It is known to employ cast iron, e.g. grey cast iron and malleable cast iron, in the production of flanged bearing cartridges, the cartridge comprising a cast flange having a substantially flat base produced by machining with an annular antifriction bearing mounted in a central opening thereof, the bearing mounting being designed to provide self-alignment within said flange opening.

The flanges are generally produced by sand casting and such castings have enjoyed substantial success in that they are economically attractive.

However, a problem with sand cast flanges is that the casting requires machining, drilling or broaching in order to assure close tolerances in the final product. Where the flange has a hub surrounding the bearing-receiving opening, generally the hub lacks the required concentricity relative to the center of the opening. Moreover, bolt-receiving holes are usually machined in the flange for mounting said flange on machinery, such as agricultural machinery. Each of such holes should lie along a center line passing through the center of the flange opening. However, this is not always possible when such holes are subsequently drilled in sand cast flanges or are produced in the as-cast state.

A further disadvantage of a sand casting is that segregated casting pores may be present which may escape inspection, such that the castings may be subject to premature failure in the field. Another disadvantage is that the bearing mounting means or central opening of the cast flange has a propensity to wear during self-alignment movement of the bearing in the flange opening.

It would be desirable to provide an improved bearing flange that does not require sand casting for the production thereof, which is less susceptible to the problems inherent in sand cast articles and which is also economically competitive with sand castings and even less expensive than sand cast flanges.

OBJECTS OF THE INVENTION

It is thus an object of the invention to provide an improved bearing housing flange produced by powder metallurgy.

Another object is to provide a flanged bearing cartridge in which the flange is formed of sintered powdered steel, said flange being characterized by improved properties.

These and other objects will more clearly appear when taken in conjunction with the following disclosure and the accompanying drawings, wherein:

FIG. 7 is a finished sintered bearing housing flange of the type shown in cross section in FIG. 6;

STATEMENT OF THE INVENTION

Figure 1:
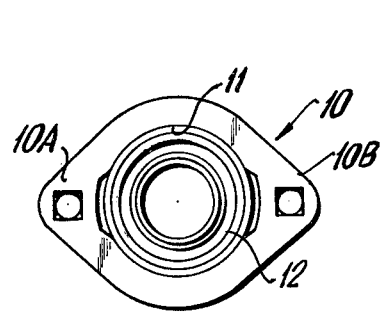
FIGS. 1, 2 and 3 are illustrative of various embodiments of flanged bearing cartridges comprising two-, three- and four-hole bolt mounting means.

One embodiment of the invention is directed to a sintered powdered steel bearing flange housing comprising bearing mounting means or seat in the form of a circular bore having a continuous inner wall of predetermined axial thickness located centrally of said housing and passing axially through the plane of said housing, said continuous inner wall having a spherically shaped groove or seat machined along its periphery for receiving an annular antifriction bearing assembly having inner and outer rings with a complement of bearing balls held therebetween, the outer ring being shaped for spherically mating with said spherical groove or seat. End flange means extend radially from the circular bore of said flange housing, with the base of said end flange means being substantially flat and having bolt-receiving holes therein, each located centrally along a line passing diametrically across said circular opening. The flange has a pair of diametrically oppositely disposed axial-access slots located on the inner wall and extending partially axially into said circular bore and merging with the spherically-shaped groove of the inner wall, the width of said slots being sufficient to enable the axial insertion of said annular antifriction bearing assembly across its diameter therein, such that when the bearing is inserted into the slots and rotated about its diameter the annular bearing assembly is caused to fit snugly into the spherical groove or seat of said bore.

The sintered powdered steel housing is provided with a sintered density ranging from about 80 to 92% of the actual (theoretical) density of the steel, the steel consisting essentially by weight of up to about 6% Ni, up to about 3% Cu, up to about 2% Mn and/or Si, about 0.2 to 1.2% C and the balance at least about 90% iron and residuals normally present in steel. A preferred steel composition consists essentially of about 0.5 to 1% C, and the balance at least about 96% iron. Another preferred steel composition consists essentially of about 0.5 to 5% Ni, 0 to about 2.5% Cu, about 0.25 to 0.8% C and the balance at least about 90% iron.

The invention is also directed to a flanged bearing cartridge capable of self-alignment comprising the sintered powdered steel bearing housing flange of the invention having said bearing mounting means in the form of a circular bore with a spherically shaped groove machined along its periphery and a pair of diametrically disposed axial-access slots located on said inner wall and extending partially axially into said circular opening and merging with the spherically shaped groove of said inner wall, the width of the slots being sufficient to enable the axial insertion and mounting of an annular antifriction bearing assembly into said bore in spherical mating relationship with said spherically shaped groove, and an annular antifriction bearing mounted in said flange bore, the bearing comprising inner and outer bearing rings with a complement of bearing elements supported therebetween, the outer ring having a spherically shaped surface in spherical mating relationship with the spherical groove or seat of said flange.

Figure 2:
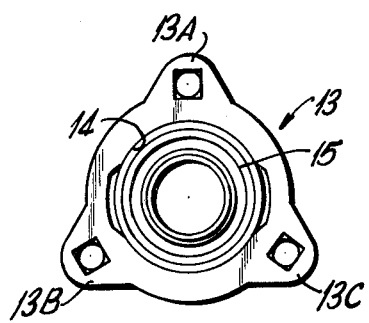
Figure 3:
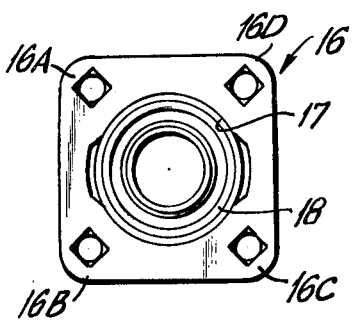

Typical flanged bearing cartridges are illustrated in FIGS. 1, 2 and 3. FIG. 1 shows a two-hole mounting flange 10 with end flange means 10A, 10B extending radially from the center thereof, the central opening or bore 11 of the flange having inserted therein an annular antifriction bearing assembly 12. As will be noted, each of the end flange means 10A, 10B has a bolt hole therein for mounting the flanged bearing cartridge to a machine element.

In FIG. 2, a substantially triangular-shaped flange 13 is shown with end flange means 13A, 13B, 13C extending radially from the central opening or bore 14 thereof, the central opening having inserted therein an annular antifriction bearing assembly 15. Three bolt holes are shown in the end flange means.

FIG. 3 shows a substantially square-shaped flange 16 with end flange means 16A, 16B, 16C, 16D extending radially from the central opening or bore 17 thereof, the central opening having an annular antifriction bearing 18 inserted therein, each of the extending flanges having a bolt hole therein.

DETAILS OF THE INVENTION

Tests have shown that P/M (powder metallurgy) flanges produced in accordance with the invention exhibit improved physical properties relative to cast iron flanges depending on the P/M density of sintered flanges.

For example, the static capacity of a flange at a P/M density of about 6.3 grs/cc (approximately 80% of true (theoretical) density based on a wrought steel density of about 7.86 grs/cc) is substantially equal to the ultimate strength of No. 25 cast iron. However, at a P/M density of about 6.5 grs/cc (about 83% of true or solid density), the static capacity of the P/M flange is substantially greater than cast iron. For example, a sintered P/M flange exhibited an ultimate tensile strength of about 44,000 psi (lbs/in$^2$) compared to 25,000 psi for cast iron, the yield strength being 27,000 psi for the P/M flange and 25,000 psi for the cast iron flange.

Although the apparent gross hardness of the P/M flange is approximately equal to or a little less than the cast iron flange (e.g. 65 to 70 Rockwell B for the P/M flange as compared to about 90 Rockwell B [$R_B$] for cast iron), the intrinsic hardness of the P/M flange is higher by virtue of the pearlitic structure of the steel which contains hard iron carbide particles. Tests have indicated that the low density P/M part exhibits greater resistance to wear, particularly when the self-aligning bearing is subjected to cyclic wear testing against the spherical seat of the flange. The average seat wear for P/M flange was about one-fifth of that for the cast iron flange (0.004 inch as compared to 0.020 inch for cast iron). While the sintered flange and the cast iron flange have a Brinell hardness of about 85, the intrinsic or particle hardness of the sintered steel flange is much higher and in the neighborhood of about 20 Rockwell C (e.g. 230 Brinell).

Substantially no adverse machining effects were experienced using the same tooling, feeds and speeds employed on cast iron flanges. Moreover, the base milling and machining steps normally employed for cast iron were substantially eliminated for the P/M flange, since the required flatness of 0.005 inch maximum was easily obtainable with the sintered P/M part without machining. Thus, a main advantage of the invention is the close tolerance obtainable which allows for lower chuck pressures during machining.

High machining pressures in cast parts tend to produce spherical bearing seats which are slightly out of round which lead to torque problems. However, with the P/M part, this problem is substantially eliminated. Thus, tooling for the spherical seat is modified to allow for the reduced pressure in production which provides more accurate control of the dimensions of the spherical seat. P/M flange housings have been machined and random matched with bearings yielding a smaller spread of torque values of about 75 to 150 in-lbs as compared to the much broader spread of 50 to 300 in-lbs for cast iron flange housings.

Figure 4:
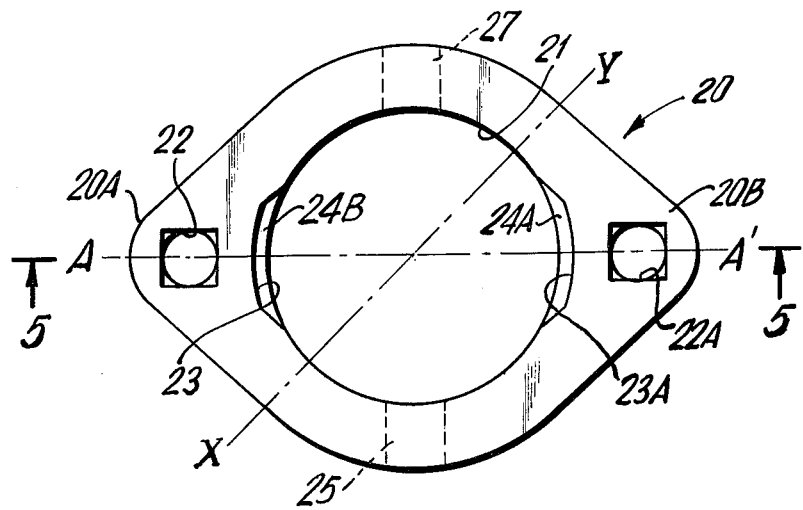
FIG. 4 is a plan view of a sintered bearing housing flange of the type employed in the flanged bearing cartridge of FIG. 1.
Figure 5:
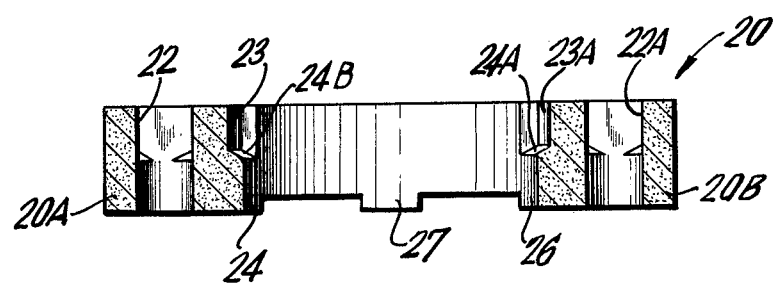
FIG. 5 is a cross section of a sintered bearing housing flange as viewed along line 5—5 of FIG. 4.

A P/M flat flange without a hub surrounding the opening is shown in FIGS. 4 and 5, FIG. 5 being a cross section taken along line 5—5 of FIG. 4. Referring to the plan view of FIG. 4, a P/M flange 20 produced in accordance with the invention is shown having a central opening 21 and end flange means 20A, 20B with bolt holes 22, 22A produced by die-forming, half of the hole depth having a square configuration, the remaining half being circular; the holes may be tapered to enable withdrawal of the die pins of the die. An advantage of using P/M pressing techniques in producing the flange housing is that bolt holes 22, 22A can be accurately produced along center line A-A' which passes through the center of central opening 21.

Diametrically opposed axial-access slots 23, 23A are provided located on the inner wall of the circular opening, which slots extend partially axially into the wall of said circular opening, substantially midway into the depth of said opening. This is shown more clearly in FIG. 5.

The bottom shoulders 24, 24A of the slots are bevelled as shown. The bevel configuration was found to give better control during compaction of the flange from the steel powder.

As will be noted from FIG. 5, the P/M part is produced flat with feet 24, 25, 26 and 27 being provided to assure uniform flat bearing areas along with end flanges 20A and 20B.

Figure 10:
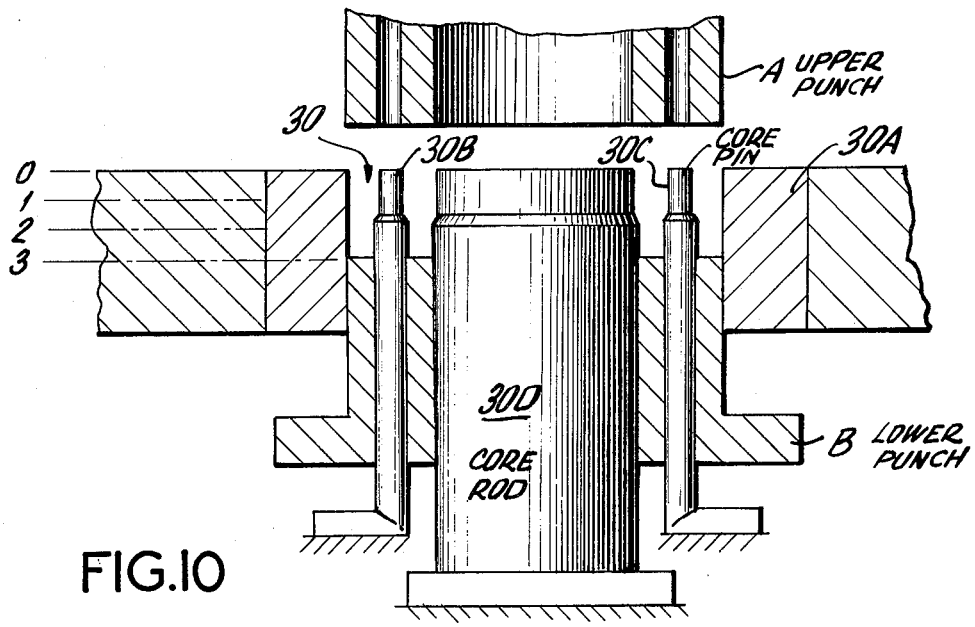
FIG. 10 is a schematic representation in cross section of upper and lower dies for producing the flange of the invention.

In producing the part shown in FIGS. 4 and 5, reference is made to the schematic of FIG. 10 which shows a typical upper and lower die relationship, the cross section being taken to correspond to the center line A-A$^1$ of FIG. 4.

The start position of compaction is shown in FIG. 10, with punches A and B positioned relative to the die as shown, with core pins 30B, 30C for producing the bolt holes passing through punch B. A core rod 30D is shown for producing the center opening of the flange.

In producing a part, the following steps may be employed:

Step 1: Fill annular cavity 30 of the die with the desired steel powder composition, the amount of powder after compression corresponding to the final dimensions desired. The amount of powder is sufficient to fill the cavity to level of the top face of die support 30A.

Step 2: Then bottom surface of punch A is lowered to an incremental level 1, while elevating B's upper surface to level 2. This provides 3:1 volume reduction for compressed powder. 'Step 3: Raise A by an amount to clear the top surface of the die.

Step 4: Raise B's upper surface to the top of the die or slightly above it to release the compacted part from the die.

The Steel Powder Composition

As stated earlier, the particular steel compositions to which the invention is applicable consists essentially of up to about 6% Ni, up to about 3% Cu, up to about 2% Mn and/or Si, about 0.2 to 1.2% C and the balance at least about 90% iron and residuals normally present in steel.

Where the P/M flange part is to replace grey cast iron, the preferred composition consists essentially of about 0.5 to 1% C and the balance at least about 96% iron. Where the P/M flange part is to replace malleable cast iron, the preferred steel composition consists essentially of about 0.5 to 5% Ni, 0 to 2.5% Cu, about 0.25 to 0.8% C and the balance at least about 90% iron.

The types of steel powder used are preferably selected according to their economic attractiveness as well as practicality. The powder composition may comprise a mixture of elemental powders. Generally, such mixtures tend to result in composition heterogeniety. However, pre-alloyed powders may be employed, such as those produced by atomization from a liquid melt. To assure that such powders are compactable, the carbon is omitted from the composition, the carbon being subsequently blended with the atomized powder prior to compaction. The carbon can also be added by carburizing the sintered blank.

Powder Metal Compaction

The conditions employed for producing the P/M flange are similar to those set forth in U.S. Pat. No. 3,782,794 owned by the same assignee.

In producing the sintered flange, the steel powder composition is cold compressed similarly as described for the method corresponding to FIG. 10. The compaction pressure may range from about 25 to 75 tons/in² (TSI) and generally from about 30 to 50 TSI, the density ranging from about 80 to 92% of true (theoretical) density, that is, ranging from about 6.3 grs/cc to 7.2 grs/cc and, more preferably, from about 80 to 90% density which corresponds to about 6.3 or 6.4 grs/cc and which ranges up to about 6.9 or 7 grs/cc.

The part is produced very close to size. Following compression and removal of the part from the die, the compact tends to grow slightly and then shrinks substantially to size following sintering at 2050° F.

The cold pressed blank is sintered under substantially non-carburizing conditions in an atmosphere of cracked ammonia, endo gas, hydrogen, etc., for about 20 to 30 minutes at about 2050° F. The part is produced with close tolerance. Following sintering, the inner wall of the part is machined to provide a spherical groove or seat for the bearing assembly, the oppositely disposed slots merging with the spherical groove.

Figure 6:
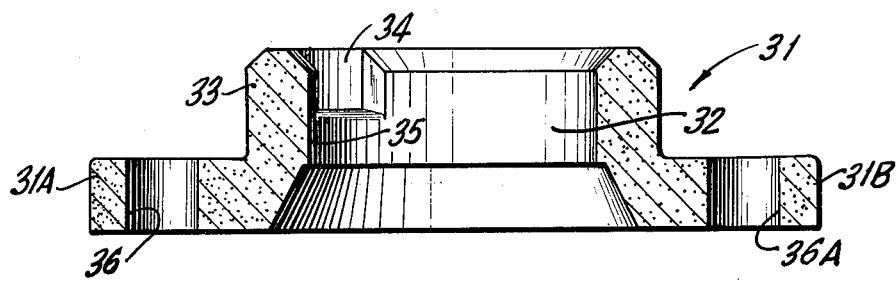
FIG. 6 is a cross section of a sintered bearing housing flange showing a hub surrounding the central opening thereof.

In addition to the configuration shown in FIGS. 4 and 5, the invention is also applicable to the production of a housing flange of the type shown in FIGS. 6 and 7, FIG 7 being a three-dimensional representation of the cross section of FIG. 6.

As will be noted, the flange 31 of FIG. 6 has a central circular opening 32 with a coaxially extending hub 33, the hub showing one of two diametrically opposed slots 34. The inner wall 35 is shown in the as-sintered state prior to machining of the spherical seat. End flange means 31A, 31B extend radially from the center of the flange opening, with bolt holes 36, 36A provided as shown.

Figure 8:
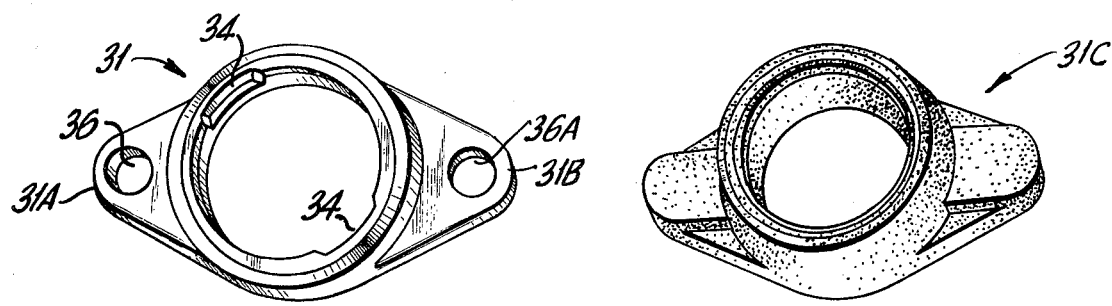
FIG. 8 is a typical unfinished sand cast flange similar to the sintered flange of FIG. 7.

The cast prior art flange is shown in FIG. 8. The advantage of the sintered flange of FIG. 6 is that the hub in the as-sintered state is substantially concentrically accurate, whereas, the hub of the sand cast flange 31C of FIG. 8 is not generally concentric with the center of the flange opening. The machining of accurately arranged bolt holes is a problem for sand cast flanges.

Figure 9:
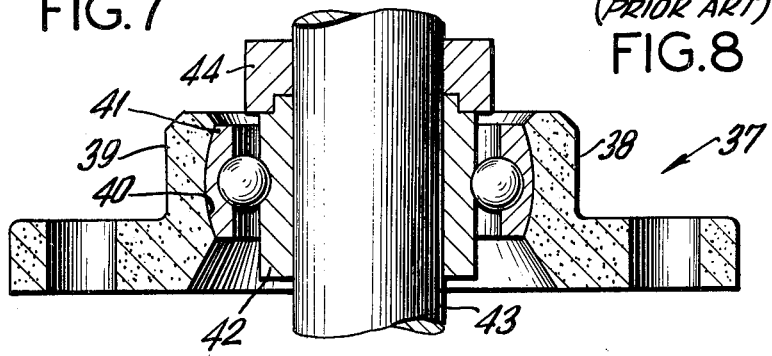
FIG. 9 is a cross section of a flanged bearing housing showing a sintered powder metallurgy flange with an annular antifriction bearing mounted in the bore thereof.

FIG. 9 is a cross section of a completed flanged bearing cartridge 37, comprising flange 38 having an axially extending hub 39 with the inner wall thereof provided with a spherical groove 40 into which is seated an annular antifriction bearing assembly comprised of outer ring 41 having a spherical outer surface seated in the spherical groove of the flange, the bearing assembly also having and inner ring 42 with a complement of bearing balls supported between said inner and outer rings. The inner ring is supported on shaft 43, a self-locking collar 44 being provided for coupling the inner bearing ring to the shaft.

The P/M flanges produced by the invention can be provided with a fairly broad range of properties, including properties comparable to grey and malleable cast as well as superior to the cast irons.

Figure 11:
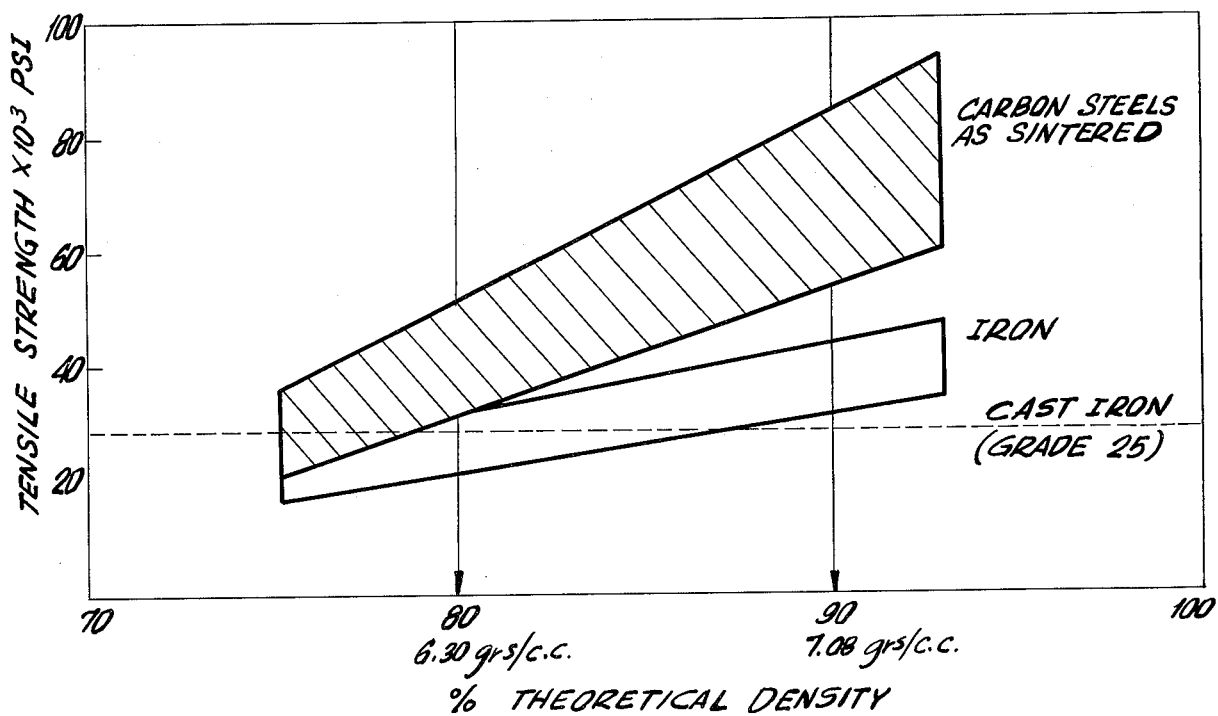
FIG. 11 is a plot comparing the tensile strength of sintered carbon steel parts to sintered iron powder and to Grade 25 cast iron.

In this connection, reference is made to FIG. 11 which is a plot comparing properties of as-sintered carbon steel, with sintered iron and with Grade 25 cast iron. As will be noted, at 80% density and above, the tensile strength of sintered carbon steel (98–99% Fe, 0.6 to 1% C and the balance residuals) is superior to cast iron as well as superior to sintered iron.

As stated earlier, wear tests conducted comparing the sintered flange of the invention with cast iron flanges showed the sintered flanges to be superior. The test comprised subjecting the flange and the bearing therein to dynamic misalignment by causing the outer ring of the bearing to oscillate against the spherically grooved seat of the flange by eccentrically rotating the shaft.

Figure 12:
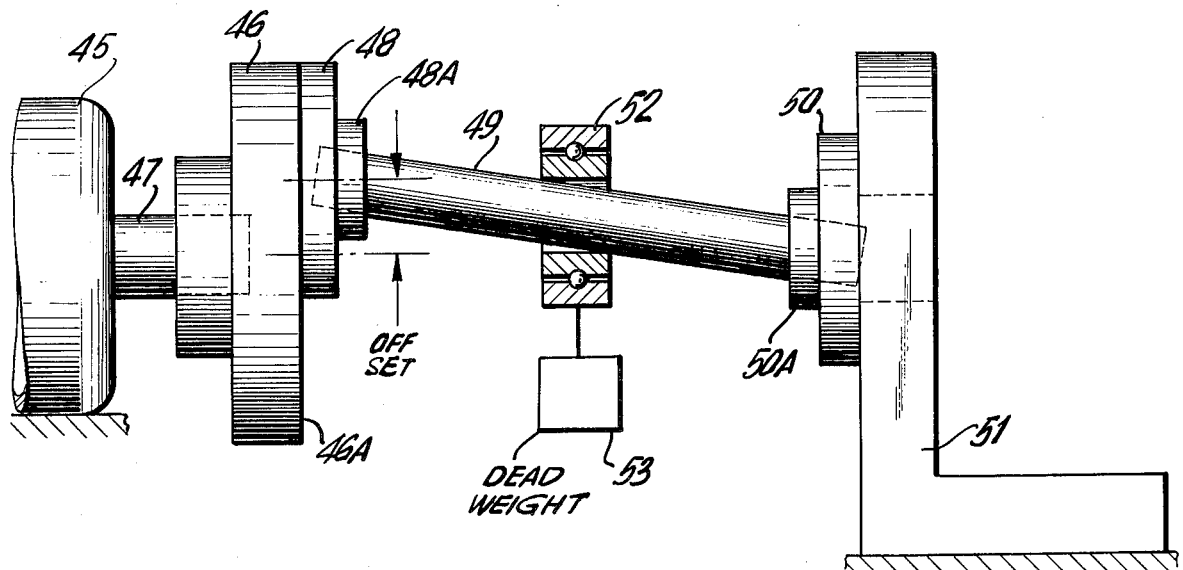
FIG. 12 is a schematic of a wear testing device for comparing the wear resistance of a sintered steel flange with the wear resistance of a cast iron flange.

The testing device is shown schematically in FIG. 12, the amount of eccentricity being exaggerated in the drawing, the misalignment being actually about plus or minus 4° to 5°.

Referring to FIG. 12, drive motor 45 is shown stationarily fixed and having a chuck 46 mounted on motor shaft 47. Mounted on face 46A of the chuck and offset from the axis of the shaft is a flanged bearing cartridge 48 with an annular bearing 48A supported therein. A shaft 49 is supported within the bearing opening and is offset at an angle as shown, the shaft extending and being coupled to another flanged bearing cartridge 50 via bearing 50A mounted therein, the flanged cartridge being mounted on a fixed L-shaped support 51 as shown.

Supported midway along shaft 49 is a flanged bearing cartridge 52, the cartridge supporting a dead weight 53 of about 50 lbs. The P/M and the cast iron flanged bearing cartridge tested were the same size (one inch flange bore). The cartridges were tested at a misalignment of ±5° and cycled at 190 cycles per minute under a radial load of 50 lbs.

After 50 hours of testing, the P/M indicated a wear of less than half of the wear indicated for the cast iron flange. The The results obtained on one inch housing or flange bores are given as follows:

Table

| ANGLE OF MISALIGNMENT - | | | ± 5° |
|---|---|---|---|
| CYCLES PER MINUTE - | | | 190 |
| RADIAL LOAD - | | | 50 pounds |
| SHAFT DIAM. | | | 1.000" |
| BORE WIPED CLEAN BEFORE TESTING | | | |
| FLANGE MATERIAL | FLANGE NO. | HOURS RUN | HOUSING BORE WEAR, INCHES |
| P/M | 2 | 50 | .0022 |
| " | 7 | 50 | .0031 |
| " | 9 | 50 | .0049 |
| " | 5 | 50 | .0055 |
| | | | .0039 Average Wear |
| Cast Iron | 6 | 50 | .0137 |
| " | 8 | " | .0179 |
| " | 4 | " | .0183 |
| " | 10 | " | .0266 |
| | | | .0191 Average Wear |

As will be noted from the table, the P/M flange bore exhibited an average wear of about 0.0039 inch, while the cast iron flange exhibited a much higher wear of about 0.0191 inch, the wear of the P/M part being about one-fifth of that of the cast iron part.

As will be clearly apparent, the P/M flange provides many advantages over the cast iron flange as follows: (1) greater resistance to wear, even though the gross hardness of the P/M part is substantially comparable to the cast iron part; (2) accuracy of part manufacture, particularly with regard to concentricity of the hub and bolt hole alignment with the flange bore; (3) high flatness tolerance in the as-sintered state of the P/M part; (4) holding of the bolt holes to broaching tolerance; (5) uniform metallographic structure as compared to segregated pores which tend to occur in sand cast flanges; and (6) improved strength properties, including improved ductility.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A sintered compacted powdered steel bearing flange housing, said housing comprising, bearing mounting means in the form of a circular bore having a continuous inner wall of predetermined axial thickness located centrally of said sintered housing and passing axially through the plane of said housing, said continuous inner wall having a spherically shaped groove machined along its periphery for receiving an annular antifriction bearing assembly having inner and outer rings with a complement of bearing balls held therebetween, said outer ring being shaped for spherically mating with said spherical groove, end flange means extending radially from said circular bore of said flange housing, said end flange means being substantially flat and each having bolt-receiving holes therein, each located centrally along a line passing diametrically across said circular bore, and a pair of diametrically oppositely disposed axial-access slots located on said inner wall and extending partially axially into said circular bore and merging with the spherically-shaped groove of said inner wall, each of said slots having a bevelled bottom shoulder formed by compaction, the width of said slots being sufficient to enable the axial insertion of said annular antifriction bearing assembly across its diameter therein into said bore, such that when said bearing is inserted into said slots and rotated about its diameter, said annular bearing assembly is caused to fit snugly into the spherical groove of said bore, said sintered powdered housing being formed of a steel composition and having a sintered density ranging from about 80 to 92% of the theoretical density of said steel composition, said steel composition consisting essentially by weight of up to about 6% Ni, up to about 3% Cu, up to about 2% Mn and/or silicon, about 0.2 to 1.2% C and the balance at least about 90% iron and any residuals normally present in steel, said sintered housing when employed in a flanged bearing cartridge being characterized by a metallographic structure of pearlite, by improved resistance to wear at the machined spherically shaped groove, and by improved strength properties and ductility as compared to a cast iron bearing housing.

2. The sintered steel flange of claim 1 wherein the steel consists essentially of about 0.5 to 1% C, and the balance at least about 96% iron.

3. The sintered steel flange of claim 1, wherein the steel contains about 0.5 to 5% Ni, 0 to about 2.5% Cu, about 0.25 to 0.8% C and the balance at least about 90% iron.

4. The sintered bearing flange housing of claim 1, wherein said flange bore has a hub extending coaxially therefrom, said hub in the as-sintered state being concentric with said bore.

5. A flanged bearing cartridge capable of self-alignment which comprises, a sintered compacted powdered steel bearing flange housing having a bearing mounting means in the form of a circular bore having a continuous inner wall of predetermined axial thickness located centrally of said housing and passing axially through the plane of said housing, said continuous inner wall having a spherically shaped groove machined along its periphery and a pair of diametrically disposed axial-access slots located on said inner wall and extending partially axially into said circular bore and merging with the spherically shaped groove of said inner wall, the width of said slots being sufficient to enable the axial insertion and mounting of an annular antifriction bearing assembly into said bore in spherical mating relationship with said spherically shaped groove, each of said slots having a bevelled bottom shoulder formed by compaction, and an annular antifriction bearing mounted in said flange bore, said bearing comprising inner and outer bearing rings with a complement of bearing elements supported therebetween, the outer ring having a spherically shaped surface in spherical mating relationship with the spherical groove of said bore in said flange, said sintered powdered flange being formed of a steel composition and having a sintered density ranging from about 80 to 92% of the theoretical density of said steel composition, said steel composition consisting essentially by weight of up to about 6% Ni, up to about 3% Cu, up to about 2% Mn and/or Si, about 0.2 to 1.2% C and the balance at least about 90% iron and any residuals normally present in steel, said sintered housing in said bearing cartridge being characterized by a metallographic structure of pearlite, by improved resistance to wear at the machined spherically shaped groove, and by improved strength properties and ductility as compared to a cast iron bearing housing.

6. The flanged bearing cartridge of claim 5, wherein the steel of the sintered flange consists essentially of about 0.5 to 1% C, and the balance at least about 96% iron.

7. The flanged bearing cartridge of claim 5, wherein the steel of the sintered flange consists essentially of about 0.5 to 5% Ni, 0 to about 2.5% Cu, about 0.25 to 0.8% C, and the balance at least about 90% iron.

8. The flanged bearing cartridge of claim 5, wherein said flange bore has a hub extending coaxially therefrom, said hub in the as-sintered state being concentric with said bore.

* * * * *